Figure 1:
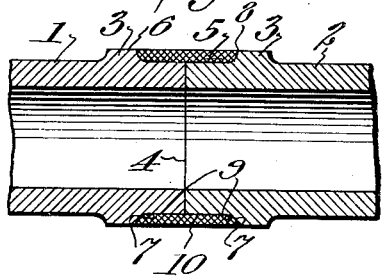

Dec. 8, 1931.  S. W. MILLER  1,835,236

FUSION WELDED JOINT

Filed Nov. 11, 1924

Inventor:

Samuel W. Miller,

By Byrnes, Townsend & Brickenstein,

Attorneys.

Patented Dec. 8, 1931

1,835,236

UNITED STATES PATENT OFFICE

SAMUEL W. MILLER, OF HOLLIS, NEW YORK, ASSIGNOR TO THE LINDE AIR PRODUCTS COMPANY, A CORPORATION OF OHIO

FUSION WELDED JOINT

Application filed November 11, 1924. Serial No. 749,342.

This invention relates to fusion welded pipe joints but it will presently appear that certain features of the invention may be utilized in welding other structures.

One well known way of making a welded pipe joint is to bevel the opposed ends of the sections and then fuse into the V-shaped groove formed thereby, as much weld metal as the welder thinks desirable. Considerable difficulty is experienced in obtaining a sufficient but not too great a penetration of the weld metal into the sharp angle of the V-groove. Furthermore, welders often add more weld metal than necessary to that filling the V-groove in their desire to strengthen the joint. However, it has been found that, in the case of cast iron pipe properly welded in the manner indicated and tested to destruction, the actual fracture usually occurs in the pipe proper outside the weld, which shows that the joint is generally stronger than the pipe adjacent thereto. Since the weld is already stronger than the pipe, further addition of weld metal is simply a waste of labor and material.

To eliminate the expense of beveling the pipe ends and other objections to the welding method just described, it has become practice to abut the pipe sections end to end, without beveling such ends, and then fuse welding metal onto these sections adjacent the abutting ends to build up a band of suitable width and thickness around the pipe lengthwise of and covering the seam. This weld can be applied at less cost than the V-type weld and when properly made is of greater strength than the pipe. Inasmuch as the tensile strength of this weld depends upon its thickness and the shear strength upon its width, there is a tendency on the part of the average welder to apply considerably more weld metal than actual calculations would require, and there is, of course, also the possibility that not enough welding material will be applied for some joints. On the one hand, lack of strength may have serious consequences, and on the other hand, if the work is carried further than necessary, weld metal, gas or electric current used in welding, and the welder's time will be wasted.

The principal object of this invention is to overcome the disadvantages of fusion welded joints heretofore constructed, especially those just described; and to provide an improved joint that is certain to be as strong as the parts connected thereby and that may be formed without wasting materials or labor. To this end, a channel is provided lengthwise of the adjoining sections, bridging the seam across which a weld is to be formed. This channel is desirably formed by two mating half channels in the adjoining sections, which together are exactly the proper depth and width to hold an amount of welding metal needed to make a joint of the required strength. The half channels extend only part way through the pieces to be united, leaving flat ends of substantial width whereby the pieces may abut end to end on a substantial area. Knowing the properties of the sections to be united and the particular weld metal to be used, the dimensions of such a channel can be accurately calculated in advance; and with it as a guide or indicator, the welder has no difficulty in filling in exactly the right amount of weld metal and providing a satisfactory joint with a minimum of labor and materials.

Another object of this invention is to insure complete contact and thorough bonding of the weld metal with both the bottom and the sides of the channel. The outer corners of the sides of the channel are therefore made sharp so that heat applied thereto will be more rapidly conducted into the mass of metal back of such corners. The lower corners of the channel are desirably rounded so that the weld metal can be united at all points to the channel walls, whereby the channels may be completely filled.

In one form of the invention the side walls of the channel are formed by integral collars on the pipe which also increase the cross-section of the pipe adjacent the weld so that the pipe will be as strong there as elsewhere after the welding operation.

In another form separate collars may be secured onto the straight pipe sections in any suitable manner, as by tack welding, riveting, etc. The collars in this case also are of such height and are so spaced that they serve as gages to control the amount of weld metal to be applied.

In still another form the invention is applied to the joining of steel pipes by rolling collars into the pipe sections near the ends thereof, whereby the desired channel and abutting ends are provided when such sections are placed end to end.

In still another form of the invention the channel is formed by reducing the ends of the mating pipe sections. By depositing therein weld metal stronger than the base metal, this form of joint may be made strong enough for many purposes and at the same time will be disposed inside the periphery of the pipe.

Other objects and advantages will hereinafter appear.

Figure 2:
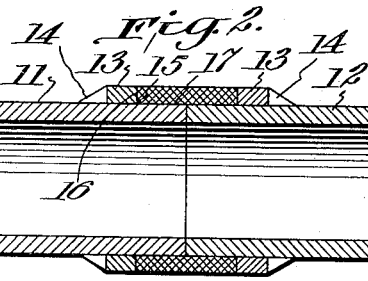
Figure 3:
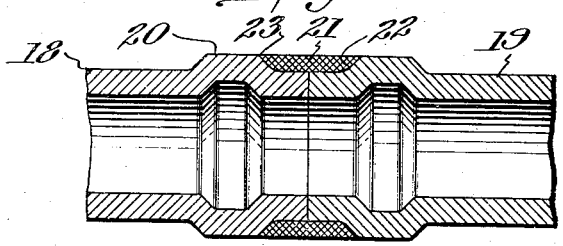
Figure 4:

In the drawings, Fig. 1 is a fragmentary, sectional view showing a pipe joint embodying one form of the invention;

Figs. 2, 3, and 4 are fragmentary sectional views showing other embodiments of the invention.

In the joint disclosed in Fig. 1, pipe sections 1 and 2 of cast iron or other metal are provided with integrally formed collars 3 near their ends. The pipe ends are alined and held with their flat ends 4 in abutting relation to form a seam so that a circumferential channel is provided between the collars 3 lengthwise of the seam. The two sections 1 and 2 are then welded together by fusing a welding metal 5 of suitable tensile and shear strength into the channel covering the seam by the use of an oxyacetylene or other blowpipe or by an electric arc. Any suitable welding metal may be employed. Bronze may be used with good results with either cast iron or steel pipe. It is stronger than cast iron pipe and will effectively adhere thereto, and although not as strong as steel, a joint of the desired strength can be produced on cast iron and steel with comparatively little metal. The use of bronze in the manner described economizes metal and other materials, keeps down the size of the joint, and saves the time of the welder. Iron and steel pipe of any diameter can usually be welded with bronze as described, without preheating.

The channel between the collars 3 is made of precisely the length and depth required to hold the necessary quantity of the selected weld metal. With a weld metal of known characteristics the proper dimensions can be accurately calculated in advance. The welder knows, therefore, that when the weld metal is built up to the level of the circumferential faces 6 of the collars 3 the proper amount of metal has been applied. The collars 3 serve in this way as gages to assure the building up of the joint to the required strength and also to prevent wasting the weld metal, and the welder's time.

The collar faces 7 which form the end walls of the channel extend abruptly inward from the collar faces 6 forming therewith sharp corners 8. These corners 8 are easily brought to the welding temperature because of their sharpness and because of their form the heat is carried more rapidly into the base metal. Thorough welding thus effected at the corners prevents minute leaks which have heretofore been found in some welded joints. The sharp corners on the collars also make it easy for the welder to tell when the metal is built up to the level of the faces 6.

Each collar face 7 is connected by a rounded corner 9 of rather large radius with the circumferential pipe surface 10 forming part of the channel bottom. These rounded corners in the channel are superior to sharp corners because they do not initiate cracks in the pipe metal as sharp corners would do, and because it is easier to get the fluid metal into the rounded corners. Because of the ease with which perfect penetration can be procured the efficient utilization of the weld metal is promoted and uniformity of results is assured. Reliance can therefore be placed upon a predetermined small amount of metal forming a joint of the desired strength.

The collars 3 also prevent the weakening of the pipe adjacent the weld, below the strength of the other parts of the pipe. It has been found by test that the physical properties of the pipe metal are sometimes changed by the welding heat so that fracture is ordinarily most likely to occur just beyond the reinforcement provided by the weld metal. The increased cross-sections of the pipe metal at the collars 3 compensates for this weakening of the metal however, and thus tends to make the entire pipe structure of uniform strength throughout.

The improved joint shown holds its alinement better than and is stronger than a V-shaped weld, for example. The channel is of substantially uniform depth from end to end so that the weld metal forms a ring of approximately uniform thickness around the pipe, the ring being bonded to the longitudinal cylindrical surface of the pipe throughout its length.

In the form of the invention disclosed in Fig. 2 straight pipe sections 11 and 12 have separate strips or gage collars 13 secured about them by tack welds 14 at intervals lengthwise thereof, or by other suitable means such as spot welds, rivets, or the like. These gage strips or collars may also be clamped or otherwise held in place, especially when flat plates are to be united by a joint as herein disclosed. When the pipe sections are placed end to end, these collars provide a channel that will hold exactly the amount of weld metal required to form a joint of the desired strength. The corners 15 formed by the surfaces 16 of the collars and the surface 17 of the pipe may be sharp in this instance because the bonding of the weld metal to the collars is of relatively little importance, the collars not necessarily being united to the pipe to contribute substantially to its tensile strength. It should also be noted that the collars, because they are not integral with the pipe, do not tend to initiate cracks in the pipe as sharp corners would in the case of the solid collars. This joint has practically all of the advantages of the joint disclosed in Fig. 1, and is especially adapted to be used with standard pipe of uniform diameter throughout.

The joint shown in Fig. 3 is especially adapted for steel pipe or other pipe which can be rolled. Two like pipe sections 18 and 19 of steel have collars 20 formed near their ends, as by rolling. The collars 20 are of such height and are so spaced that the pipe sections, when brought together, form between them a channel of the proper dimensions to hold the required amount of weld metal 21. This channel is formed with rounded corners 22 and relatively sharp corners 23 as in Fig. 1. Bronze may also be used as the weld metal in this form. Although it is not as strong as steel the amount required is not excessive, and its use is economical for reasons already explained.

In some cases it is desirable to avoid increasing the external diameter of the pipe at the welded joint. Fig. 4 shows a joint which meets this requirement but which, nevertheless, can be made strong enough for many purposes. Pipe sections 24 and 25 are reduced at their ends so that when these ends are brought together a channel is formed for the weld metal 26. The weld metal 26 may be much stronger than the base metal of the pipe and hence the joint may be made of greater strength than the longitudinal bursting strength of the pipe. In this case as in the case of the joints previously described the side walls of the channel form sharp corners 27 with the outer surface 28 of the pipe but connect with the bottom 29 of the channel through rounded corners 30, for reasons previously explained.

As shown, the channel for the weld metal is desirably comparatively wide and shallow but may vary somewhat from that shape depending upon the compositions of the base metal and weld metal, and the tensile and shear strengths calculated for the particular joint required.

Although the invention has been described with particular reference to the welding of pipes, it will be understood that its utility is not limited to this class of work but it may also be applied to the welding of other structures, such as rods, shafts, plates, etc.

Variations may be resorted to within the scope of the invention and parts of the improvements may be used without others.

I claim:

1. A fusion welded joint comprising sections arranged in abutting relation and formed at their abutting ends with complementary channel portions which cooperate to provide a channel extending lengthwise of the joint, and weld metal disposed in and fusion welded to the surfaces of said channel, said channel having a wide substantially flat bottom and side walls adapted to gage the quantity of weld metal required for said joint.

2. In a fusion welded pipe joint, the combination of pipe sections arranged end to end, collars on the pipe sections at a distance from their ends and cooperating with the intermediate circumferential surfaces of said sections to form a channel bridging the seam between said sections, and weld metal disposed in said channel and fusion welded to said collars.

3. In a fusion welded pipe joint, in combination a pair of pipe sections arranged end to end, the pipe sections being thickened near their ends to form collars, the collars cooperating with the end portions of the pipe sections to form a channel, and weld metal of greater tensile strength than the metal of the pipe sections completely filling the channel and united to the surfaces thereof, the collars being of a height to indicate when a sufficient quantity of the selected weld metal has been added to form a joint as strong as the pipe itself, and the collars being of a thickness sufficient to maintain the strength of the pipe at the collars up to the strength of the rest of the pipe even after the collars have been subjected to welding heat.

4. In a fusion welded pipe joint, in combination a pair of pipe sections arranged end to end in abutting relation, the pipe sections being provided with outwardly deformed portions at short distances from their abutting ends and cooperating with the end portion of the pipe sections to form a channel, and weld metal united to the surfaces of the pipe sections that form the sides and bottom of the channel.

5. In a fusion welded pipe joint, in combination a pair of pipe sections arranged end to end in abutting relation, said sections being reduced at the ends to form a broad, shallow channel for the reception of weld metal; weld metal of greater strength than the metal of the pipe itself, exactly filling the channel and fusion welded to the walls thereof, the dimensions of the channel being so related to the strength of the weld metal that the stronger weld metal offsets the loss of strength caused by the reduced cross section of the base metal at the joint, without protruding beyond the peripheral bounds of the pipe.

6. In a fusion welded pipe joint, in combination a pair of pipe sections arranged end to end, the pipe sections being formed at their ends with complementary channel portions that cooperate to form a broad, shallow channel around the pipes, weld metal filling the channel, the channel having side walls and a smooth bottom free from angles, the side walls being merged into the bottom through rounded corners that can be easily filled with the weld metal, but terminating at their outer extremities in sharp edges that can be easily raised to welding temperature, so that the welding metal is caused to be thoroughly bonded with the bottom and side walls of the channel.

7. A fusion welded pipe joint comprising sections arranged in abutting relation and formed at their abutting ends with complementary channel portions which cooperate to provide a broad shallow channel having a substantially flat bottom and gaging side walls, said bottom being of substantially the same diameter as the external diameter of the main portion of the pipe, and weld metal of known strength filling the channel and fusion welded to said bottom and said walls to form a bond of uniform width and substantially uniform thickness and of a strength substantially equal to that of the main portion of the pipe.

In testimony whereof, I affix my signature.

SAMUEL W. MILLER.